United States Patent [19]

Bacardit et al.

[11] Patent Number: 4,660,459

[45] Date of Patent: * Apr. 28, 1987

[54] ROTARY HYDRAULIC DISTRIBUTOR, MORE PARTICULARLY FOR A POWER STEERING SYSTEM

[75] Inventors: Juan S. Bacardit; Fermin P. Planas, both of Barcelona, Spain

[73] Assignee: Bendiberica S.A., Barcelona, Spain

[ * ] Notice: The portion of the term of this patent subsequent to Apr. 15, 2003 has been disclaimed.

[21] Appl. No.: 834,158

[22] Filed: Feb. 27, 1986

Related U.S. Application Data

[63] Continuation of Ser. No. 698,735, Feb. 4, 1985, abandoned, which is a continuation of Ser. No. 426,403, Sep. 29, 1982, abandoned.

[30] Foreign Application Priority Data

Oct. 14, 1981 [ES] Spain .................................... 506.793

[51] Int. Cl.⁴ ............................................. F15B 9/10
[52] U.S. Cl. .................................... 91/375 R; 91/467; 137/625.21
[58] Field of Search ................ 91/374, 375 R, 375 A, 91/467; 464/77; 180/148; 137/625.21

[56] References Cited

U.S. PATENT DOCUMENTS

| | | | |
|---|---|---|---|
| 2,263,113 | 11/1941 | Wichorek et al. ....................... 64/27 |
| 2,360,157 | 10/1944 | Olson ..................................... 464/77 |
| 2,445,590 | 7/1948 | Stephenson ............................ 464/77 |
| 2,484,321 | 10/1949 | Stubau .................................... 64/27 |
| 2,868,001 | 1/1959 | Russell ................................... 464/77 |
| 2,917,079 | 12/1959 | Verbrugge et al. ............... 91/375 R |
| 2,983,283 | 5/1961 | Sattavara ............................. 137/622 |
| 3,131,602 | 5/1964 | Ford ...................................... 91/137 |
| 3,145,626 | 8/1964 | Vickers et al. ......................... 91/375 |
| 3,162,263 | 12/1964 | Brown, Jr. .......................... 180/79.2 |
| 3,170,535 | 2/1965 | Barton et al. ......................... 464/77 |
| 3,227,178 | 1/1966 | Elwell .............................. 137/625.21 |
| 3,273,465 | 9/1966 | Eddy ..................................... 91/375 |
| 3,283,538 | 11/1966 | Trefny .................................... 464/77 |
| 3,296,939 | 1/1967 | Eddy ................................... 91/375 A |
| 3,308,721 | 3/1967 | Sagawa et al. ........................ 91/375 |
| 3,616,727 | 11/1971 | Suzuki .............................. 91/375 A |
| 3,722,368 | 3/1973 | Suzuki .............................. 91/375 R |
| 3,984,998 | 10/1976 | Rogakos et al. ...................... 464/77 |
| 4,057,079 | 11/1977 | Taig ................................. 137/625.23 |
| 4,117,864 | 10/1978 | Taig ................................ 127/614.12 |
| 4,148,385 | 4/1979 | Sink ....................................... 464/77 |
| 4,214,642 | 7/1980 | Dauvergne ......................... 180/132 |
| 4,217,932 | 8/1980 | Bacardit ........................ 137/625.21 |
| 4,310,024 | 1/1982 | Bacardit ........................ 137/625.21 |
| 4,385,898 | 5/1983 | Jordan ............................... 91/375 A |
| 4,428,399 | 1/1984 | Masuda et al. ................. 137/625.22 |
| 4,458,580 | 7/1984 | Masuda et al. .................... 91/375 R |
| 4,488,475 | 12/1984 | Masuda et al. ........................ 91/462 |
| 4,582,086 | 4/1986 | Bacardit ............................ 91/375 A |

FOREIGN PATENT DOCUMENTS

| | | | |
|---|---|---|---|
| 0162337 | 10/1979 | Japan ............................... 91/375 A |
| 55-42698 | 3/1980 | Japan . |
| 4318330 | 7/1980 | Japan . |
| 1030277 | 5/1966 | United Kingdom . |

Primary Examiner—Robert E. Garrett
Assistant Examiner—Mark A. Williamson
Attorney, Agent, or Firm—Larry J. Palguta; Ken C. Decker

[57] ABSTRACT

The distributor comprises a primary rotating member having a prolongating portion (11) surrounding coaxially the primary rotating member (5) and forms a seat for at least a C-shaped rection spring (27) the ends of which (48) resiliently been upon a radial finger (37a) secured to the primary member and cooperate in engagement with aperatures (43a) formed in the prolongating portion (11) of the secondary member, thus forming a lost-motion coupling between the two members.

30 Claims, 19 Drawing Figures

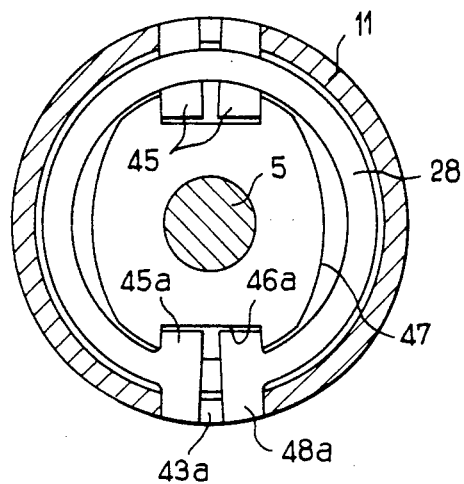
FIG_10
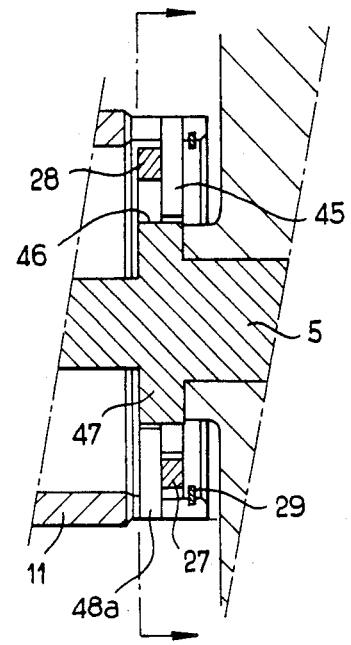
FIG_11
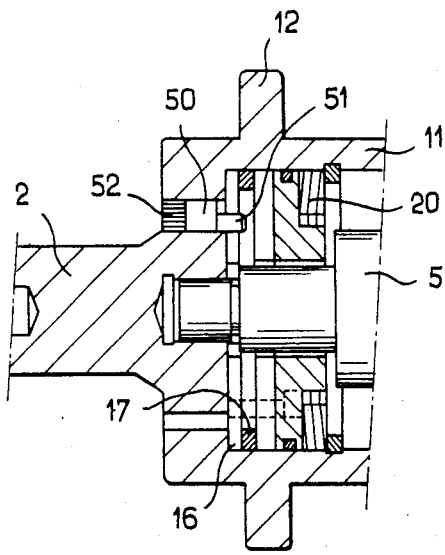
FIG_12

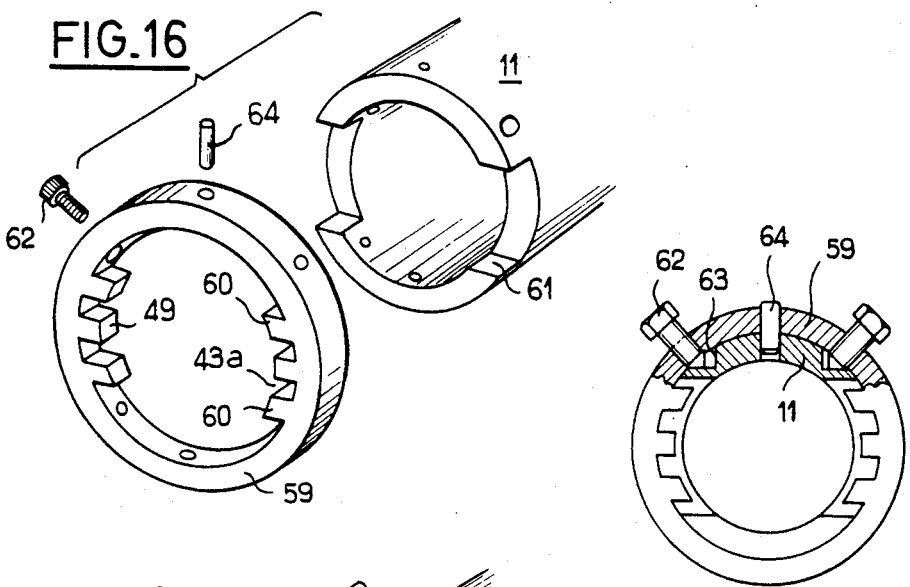
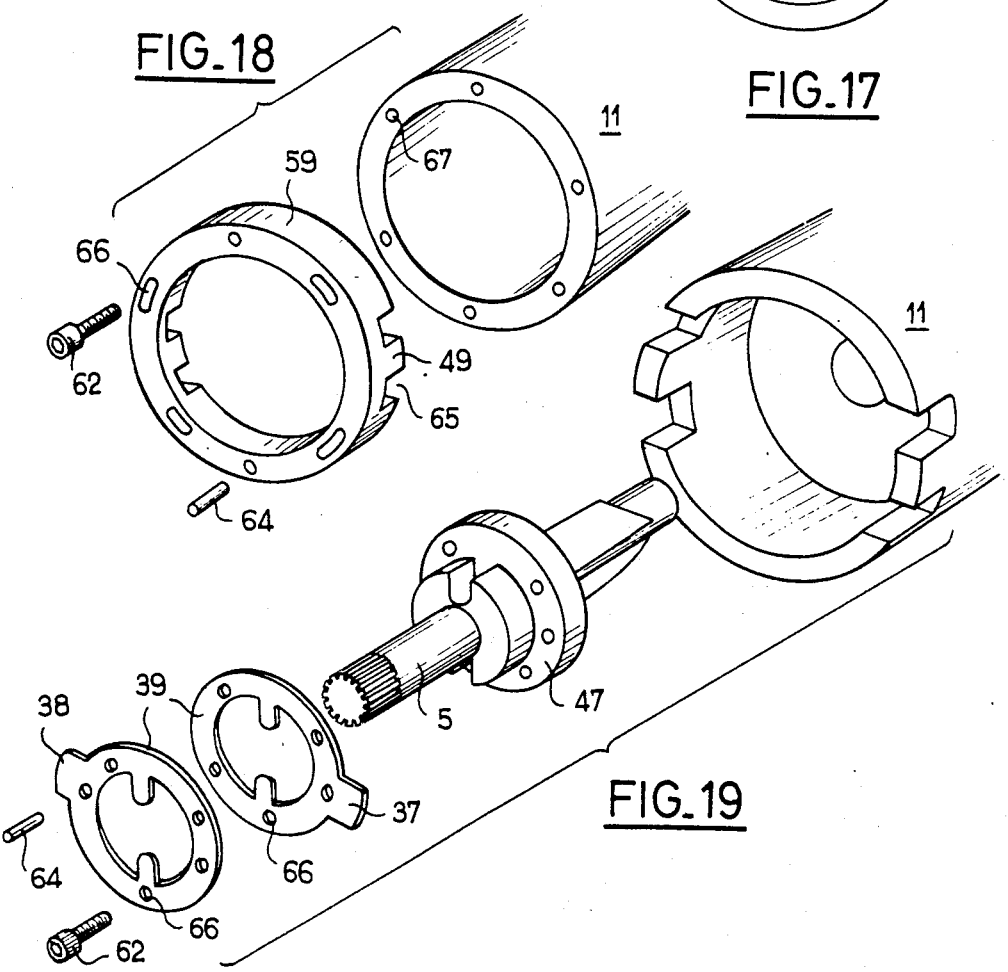

ROTARY HYDRAULIC DISTRIBUTOR, MORE PARTICULARLY FOR A POWER STEERING SYSTEM

This is a continuation of abandoned application Ser. No. 698,735 filed 2-4-85 which is a continuation of Ser. No. 426,403 filed Sept. 28, 1982, abandoned.

This invention relates to rotary hydraulic distributors designed to actuate a driven device and to control a double acting assistance power unit for assisting said driven device as a function of the control force applied to the power receiving device of the distributor.

In a known version of this type of distributor, the distributor comprises a primary rotating member to be connected to the power receiving device (typically a steering wheel) which is coupled for rotation with a rotor of the distributor valve, and a secondary rotating member to be connected to a driven device (for instance the pinion of a rack of a steering linkage of steerable wheels) which is connected to a valve stator which cooperates with the rotor to control the double acting assisting power unit for the driven device. These two members are intercoupled mechanically by a lost motion coupling which permits relative angular movement of the valve members to control the assisting power unit and at the same time, actuate the driven device when the coupling has reached its travel limit. The two valve members are interconnected by a flexible connection which ensures a reciprocal centered position of the members when the distributor is in the rest position.

Thus, a known approach makes use of a resilient member in the form of a torsion bar received within suitable recesses in the distributor members; this system, however, does not permit a pre-stressing of the resilient member although this is nevertheless desirable for many applications of this type of distributor; a further disadvantage of this type of resilient member is the necessity of providing sufficient longitudinal space for its installation within the body of the distributor, which is not possible in certain applications, for example, when using valves or distributors of the "star" type, wherein the rotor and stator consist in axially stacked disc-shaped parts which therefore occupy very little axial space.

In an alternative proposed solution, it has been suggested to make use of a C-shaped spring between the ends of which are held captive under a predetermined pre-stressing radially extending projections which make part of the primary and secondary members, respectively. In this case, since said members are serially arranged axially and since the C-shaped spring must cooperate with the adjacent ends of said members, the spring has to be arranged between these members, thereby involving an increase in the length of the unit. Thus, also, in this case, the adoption of a C-shaped spring system raises problems of size and complexity in structure.

There is accordingly an object of this invention to improve the construction of hydraulic distributors of the type described embodying a C-shaped centering spring, more particularly in the "star" valve version, in order to eliminate the above mentioned disadvantages mentioned and affording the realization of a particularly compact and reliable distributor, ensuring an easily controllable resilient reaction and an efficient centering of the valve members, while suppressing the reacting lateral forces on said valve members.

In order to meet these objects and others which will appear from the following description, there is provided a hydraulic rotary distributor of the type comprising a primary rotary member to be connected to a driving device and connected for rotation with a valve rotor, a secondary rotary member to be connected to a driven unit and connected for rotation to a valve stator, said valve stator and valve rotor cooperating mutually to a control double acting motor assisting said driven unit, said secondary member having a portion surrounding at least a portion of said primary member, said primary and secondary members being coupled by a lost motion coupling which permits a limited relative angular movement of said members, at least a C-shaped spring having separated facing ends surrounding at least said primary member, and connecting means associating said separated ends of said C-shaped spring with said primary member to maintain same in a centered rest position, characterized in that said spring has end portions normally cooperating in abutment with sides of at least a radial opening formed within said portion of said secondary member surrounding said primary member, said connecting means forming part of said lost motion coupling.

The invention will be now described in a more detailed manner in connection with preferred embodiments illustrated in the appended drawings, wherein:

FIG. 1 is a longitudinal cross-section view of a distributor in accordance with the invention, installed in a rack and pinion steering box;

FIG. 2 schematically shows in cross-section the centering and reaction device of FIG. 1;

FIGS. 4, 6, 8 and 10 are sectional views of different alternative embodiments of the device of FIG. 2;

FIGS. 5, 7, 9 and 11 are partial longitudinal cross-sections of said embodiments, respectively;

FIG. 12 is a diagrammatic partial longitudinal cross-section showing an eccentric centering stud installed in the star valve of FIG. 1;

FIGS. 16 and 17 schematically show a centering device using adjustment stops;

FIG. 18 depicts a variant of the above device in FIGS. 16 and 17; and

FIG. 19 is an exploded perspective view of a centering device which operates by adjustment of the C-shaped spring drive fingers.

Figure 1:
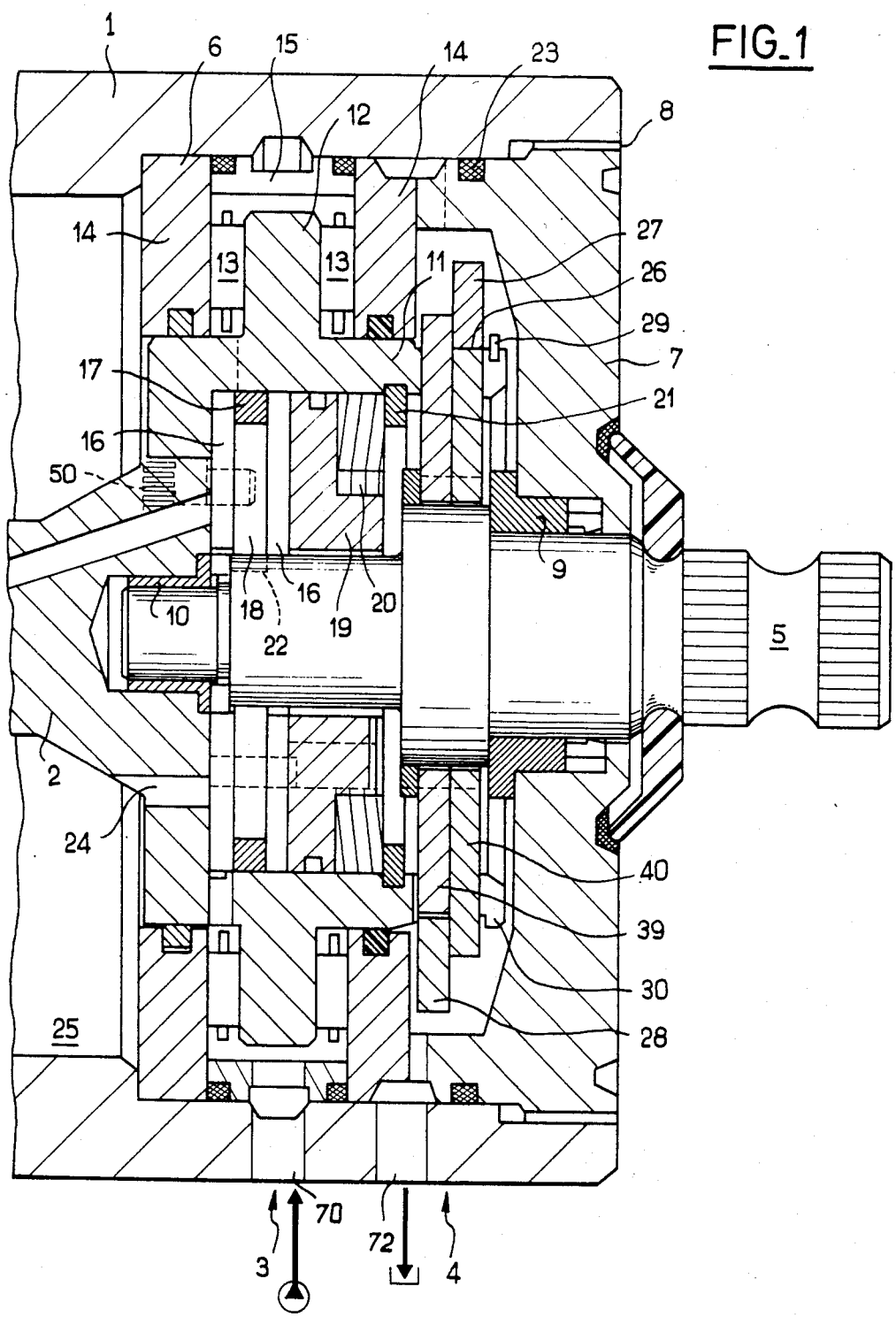

In FIG. 1, reference numeral 1 depicts the peripheral walls of the housing of a steering box containing a rack and pinion unit (not shown) which is driven by a hub 2 actuated by a vehicle steering wheel (not shown) via a rotary distributor 3 and a centering device 4, the drive being transmitted from the steering wheel by conventional means (not shown) to the drive shaft or primary component 5 of the distributor. Thus, shaft 5 and hub 2 form the primary and secondary member of the distributor 3, respectively.

As illustrated, the opening of the steering box housing forms an inner axial bearing surface 6 and is closed by a cover flange 7 peripherally threaded at 8. The primary shaft member 5 is supported in rotation with no possibility of axial movement by bearings 9 and 10 fitted in the flange 7 and on the adjacent end of the hub 2, respectively. The latter is shaped in the form of a hollow cylindrical cup or drum 11, formed peripherally with a radially extending flange 12 supported in rotation and without any possibility of axial movement by two bearings 13 which abut axially against washers 14 fixed in the inner bearing surface 6 by the cover flange 7 and an intermediary spacing ring 15. The interior of the cup 11 forms the housing for a rotary distributor of the star type, consisting of two coaxial stator plates 16 separated by a spacing ring 17 and between which is rotatably received a star-shaped flat rotor 18; the complete valve assembly is held in operating position by a compression plate 19 and a set of Belleville washers 20, retained by a stop circlip 21. The primary valve member 5 freely traverses plate 19 and the two star valve stator plates 16 and is coupled for rotation, e.g. by means of a key 22, to the star-shaped rotor 18 so that the latter can be rotatingly driven in the stator by the aforementioned primary member. The star valve distributor is of a type described in various previous patents to the Applicant, such as in U.S. Pat. No. 4,459,897 issued July 17, 1984, and entitled "Power Steering Device" which is incorporated here for reference, whereby it is considered that its construction and operation are sufficiently well known to those skilled in the art. Various seals such as 23 are shown, which serve to isolate the different operating chambers of the device, the necessary channels or ducts, such as at 24, inlet and outlet orifices 70, 72 being incorporated in the device to convey the hydraulic working fluid to the different components of the distributor and of the hydraulic assistance motor (not shown).

According to the invention, the centering device 4 also acts as a mechanical reaction device and as a lost motion connection or coupling unit which permits forces applied to the drive shaft member 5 to be transferred to the secondary member or hub 2, independently of the action of the assistance motor unit which, in the present case, may consist in two jack chambers which are defined within the steering box housing on both sides of the rack and pinion assembly, one of said chambers being partially visible in the drawing and designated by reference numeral 25.

As can be seen, the peripheral wall of cup 11 extends axially beyond the area occupied by the rotary distributor 3, and forms a spring seat 26 onto which C-shaped springs 27 and 28, are slipped on (see also FIG. 2) and are retained axially by any suitable means, for example by a circlip 29 (upper half of FIG. 1) or a radially extending lip 30 formed outwardly at the end of cup wall 11 and over which the springs can be resiliently slipped on assembly. Each spring 27, 28 has a flat configuration similar to a washer, and therefore occupies very little axial space within the device; furthermore, they have a cross-section decreasing towards their ends in order to equalize flexing of bending moments over their peripheral length.

The mechanical stop of springs 27, 28 consists of two interior teeth 31 and 32 formed on the springs adjacent their ends and which rest against the adjacent edges 33 and 34 of two recesses 35 and 36 formed symmetrically in the wall of the cup 11. The opposite ends of each spring are applied with the required pre-stressing force against the opposite lateral sides of a finger 37, resp. 38 which protrudes radially from a ring 39, resp. 40 fitted around the primary shaft 5 and secured thereto to rotate therewith by anchor pins 41 and 42. When in the rest position, the fingers 37 and 38 freely traverse a radial aperture 43, resp. 44 formed in the wall of the cup 11 between each pair of recesses 35 and 36 and the free space or play on each side of the fingers corresponds to the amount of lost motion which is required to be imparted to the device for convenient actuation of the rotary hydraulic distributor 3.

In consequence, when the primary drive shaft 5 rotates clockwise (as seen on FIG. 2), the finger 37 is moved towards the right in the aperture 43, the spring tooth 31 is pressed against side 33 of (left) recess 35 and the opposite end of this spring is separated from the facing end carrying the tooth 31, whereby a corresponding reaction force is developed, tooth 32 being separated away from side 34 of the other recess 36 with no other effect. At the same time, identical movements occur for the corresponding parts of the other C-spring cooperating with diametrally opposed finger 38, and in both cases the respective movements are exactly symmetrical when the drive shaft 5 is rotated in the opposite (counterclockwise) direction.

It will be noted that both springs 27, 28 exert a balanced action on the primary and secondary members and that no lateral reaction on the latter is produced. Their production, as also production of the intermediate parts 39, 40, is extremely simple.

Figure 4:
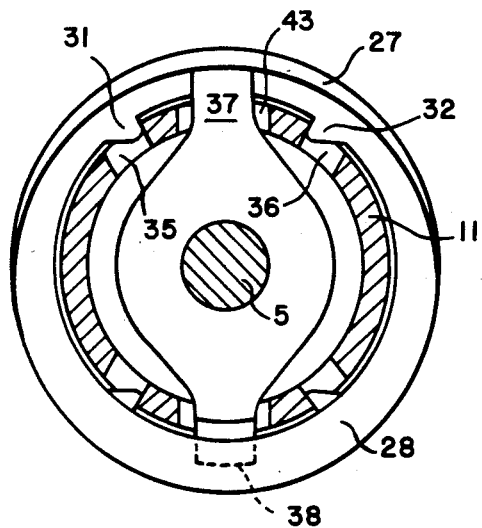
Figure 5:
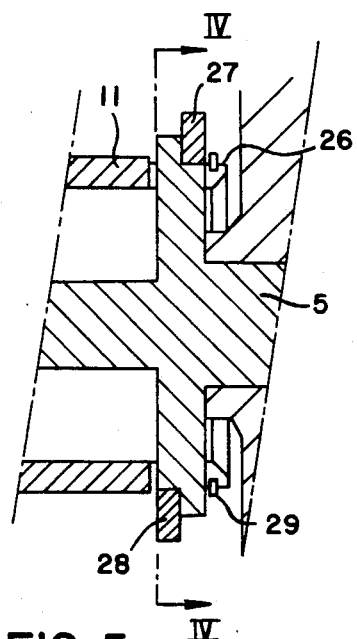

The same operation can be obtained with the arrangement shown in FIGS. 4 and 5, which is identical to the preceding design, except that fingers 37 and 38 are here integral with the primary member 5.

Figure 6:
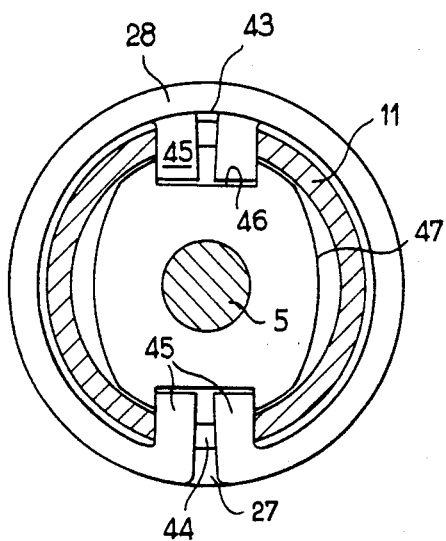
Figure 7:
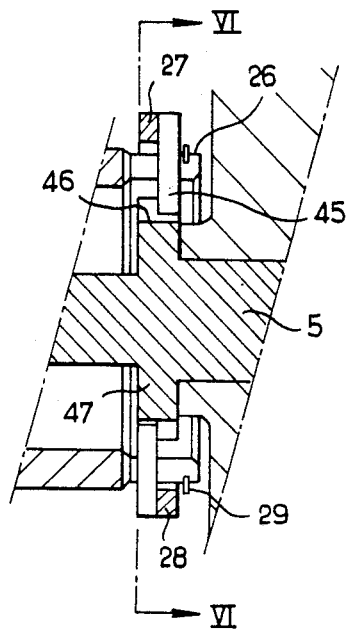

In the alternative embodiment of FIGS. 6 and 7, the ends of each spring 27, 28 are shaped with inwardly radially extending lugs 45 which protrude inwardly through the apertures 43, 44 and are received in recesses 46 formed in a substantially disc-shaped flange part 47 secured on the primary member 5. These springs 27, 28 work under tension, so as their lugs 45 bear simultaneously against the sides of the conveniently dimensioned apertures and recesses, and further serve as centering and drive stops.

FIGS. 8 to 11 show two further alternative embodiment wherein the springs 27, 28 are received inside the cup 11, between same and the primary member 5.

Figure 8:
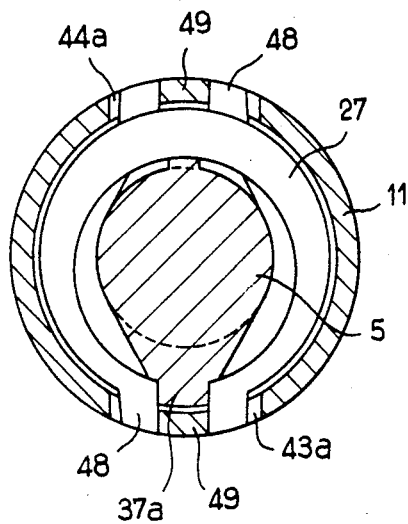
Figure 9:
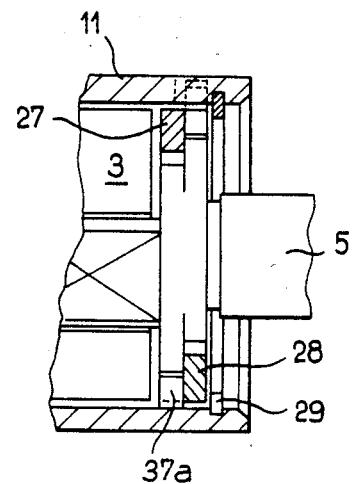

In the embodiment of FIGS. 8 and 9, the ends of each spring 27, 28 are shaped in the form of outwardly bent lugs 48, which are pressed against the opposite sides of a central stop 49 formed in the center of an aperture 43a, resp. 44a, which corresponds to aperture 43, resp 44, in the preceding embodiments. The opposite facing faces of lugs 48 protrude inwardly with respect to stop 49, whereby a finger 37a, which corresponds to finger 37 in the first arrangement, is fittingly received between them.

The embodiment shown in FIGS. 10 and 11 is in fact a combination of the features of embodiments shown in FIGS. 6 and 7 on the one hand and 8 and 9 on the other hand, in that the springs have their ends formed with lugs 45a and 48a which extend inwardly and outwardly, respectively, and which fit respectively inwards into a recess 46a of part 47 secured to the primary member 5 and outwards into a radially facing aperture 43a formed in the wall of the cup 11.

In numerous applications of this type of rotary hydraulic distributor, more particularly for power steering gears of motor vehicles, the distributor has to be centered with respect to the secondary valve element so that the primary valve member can adopt a well-defined rest position. In the case of a star type rotary distributor, use can be made of an axially extending stud mounted in the front bottom wall of cup 11 and integral with an eccentric pin 51 lodged within a slot located at a suitable place in the stator 16 of the valve, the stud having a knurled end portion 52; the front (outwardly) end of the stud 50 can be notched to fit an actuating tool (not shown in the figure). The stud 50 is fitted from the outside into a hole in the bottom of cup 11 before the knurled portion 52, which is of a slightly larger diameter than the hole, is forcibly inserted into said latter, to cause the pin 51 to make the required angular adjustment of the valve stator; the stud is then locked in the position shown, the knurled portion holding the thus obtained adjustment position.

Figure 13:
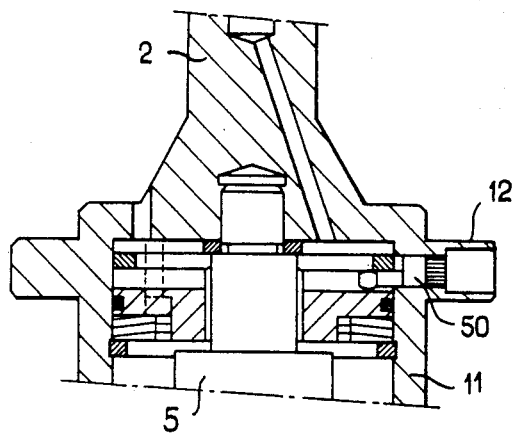
FIG. 13 shows an alternative embodiment of FIG. 12.

FIG. 13 shows an alternative embodiment of this device which only differs from FIG. 12 in that the centering stud 50 is fitted radially in the flange 12 of the secondary member 2. The same reference numerals as those shown in the former case have been retained for this figure.

Figure 14:
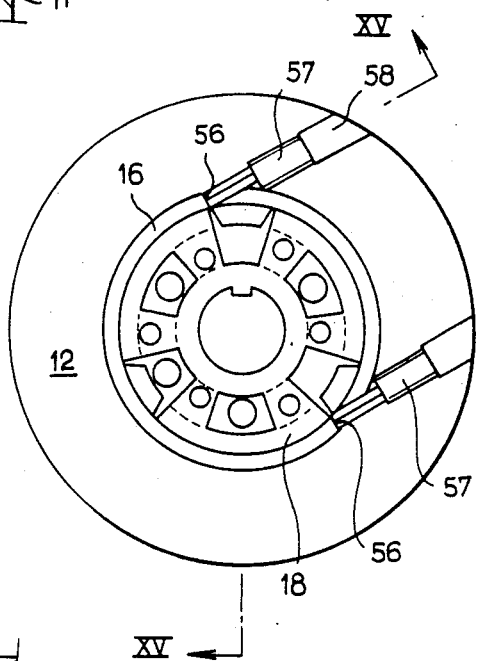
FIGS. 14 and 15 are transversal and longitudinal cross-sections of another alternative embodiment of the centering device applied to the star valve shown in the preceding figures.
Figure 15:
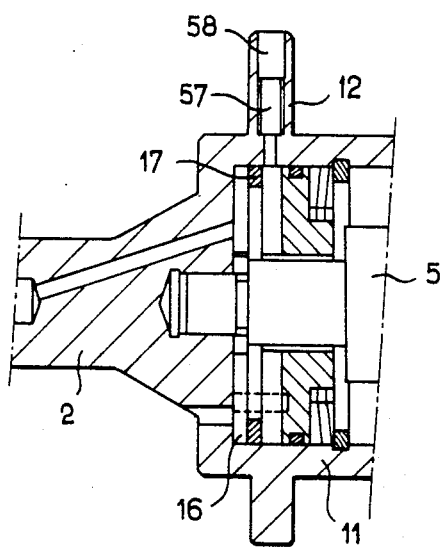

FIGS. 14 and 15 show another variant of the centering device associated to a star-type distributor, but which can also be used with rotary valves of various other types. In the embodiment shown, one of the plates 16 of the star valve stator comprises two diametrically opposite faces 56 facing a same side of the device and two stop screws 57 having substantially parallel axes tangent to the periphery of the valve rotor 18, the tip end of which comes into bearing engagement against these faces 56 and which can be adjusted in relation to corresponding threaded holes 58, so that when they are turned in opposite directions the distributor can be angularly relocated as required.

In versions of the invention, such as those shown in FIGS. 8 and 9, a centering device as illustrated in FIGS. 16 and 17 can be used. In such an occurence, the central stop 49 is formed by a protrusion protruding radially inwardly from a ring member 59 and the apertures 43a, 44a, are formed in said ring member between this central stop and two additional radially extending lugs 60 on either side of the central stop. Ring member 59 is rotatingly fitted on the outside of the end (cup 11) of the secondary member 2, on the front edge of which two diametrically opposed recesses 61 have been formed in which the lugs 60 are axially received.

Ring member 59 can be adjusted angularly by means of two tapered screws 62 screwed substantially radially in the ring member so as to bear against angularly offset milled sections 63 formed in the peripheral surface of the cup 11, the adjustment position being permanently locked by drilling and fitting of a corresponding locking pin 64.

This construction can be easily adapted to achieve the simplified embodiment shown in FIG. 18 wherein the ring member 59 is adjusted axially against the front edge of cup 11 while the central stop 49 and the apertures 43a are formed by axial notches 65 machined in the connection face of said ring member. In this case, screws 62 extend axially through oblong arcuate axial holes 66 in the ring member and penetrate into threaded holes 67 formed in the annular front edge of cup 11. The position of locking pin 64 is clearly shown in the drawing.

Figure 2:
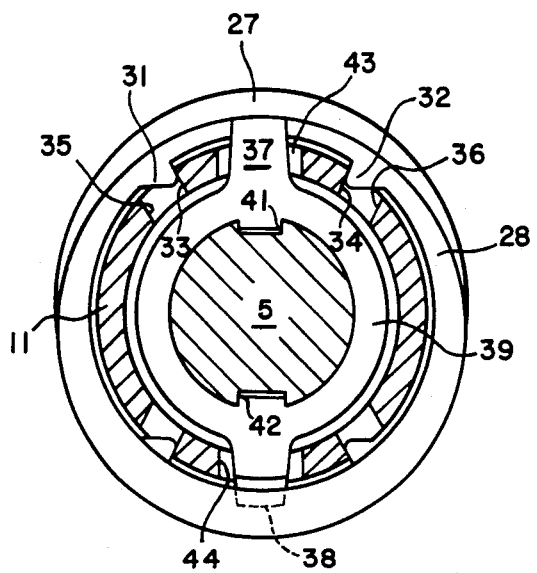
Figure 3:
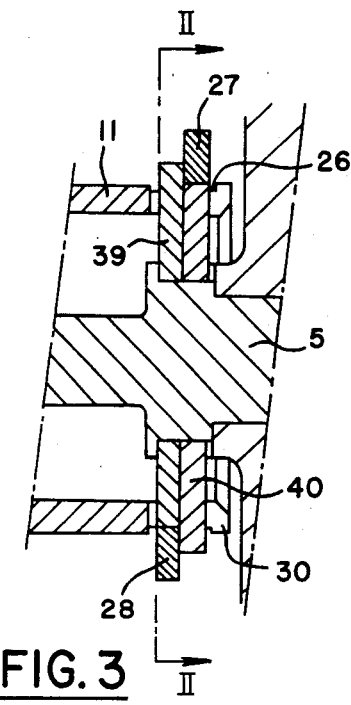
FIG. 3 is a detailed diagrammatic longitudinal cross-section of FIG. 2.

In a same way, it is possible to act upon intermediate parts connected to the primary member 5, such as parts 39, 40 in FIG. 2, to effect the centering operation, as can be clearly seen in FIG. 19.

We claim:

1. A hydraulic rotary distributor, comprising a primary rotary member to be connected to a driving device and connected for rotation with a valve rotor, a secondary rotary member to be connected to a driven unit and connected for rotation to a valve stator, said valve stator and valve rotor cooperating mutually to control a double acting motor assisting said driven unit, said secondary member having a portion surrounding at least a portion of said primary member, said primary and secondary members being coupled by a lost motion coupling which permits a limited relative angular movement of said members, at least a C-shaped spring having separated facing ends surrounding at least said primary member, and connecting means associating said separated ends of said C-shaped spring with said primary member to maintain the primary member in a centered rest position, characterized in that said connecting means comprises a driving protrusion secured to said primary member and extending radially through an aperture formed within said portion of said secondary member surrounding said primary member and inserted radially between said facing ends of said C-shaped spring which is disposed around said portion of said secondary member, said spring having end portions formed with radially inwardly extending teeth normally bearing in abutment against adjacent sides of openings formed in said portion of said secondary member on both peripheral sides of said aperture, said connecting means forming part of said lost motion coupling.

2. The distributor according to claim 1, characterized in that the distributor comprises two said C-shaped springs diametrally inverted.

3. The distributor according to claim 1, characterized in that the distributor comprises adjustable centering means for adjustably centering said rest position of said primary member with respect to said secondary member.

4. The distributor according to claim 3, characterized in that said adjustable centering means is provided on said secondary member.

5. The distributor according to claim 3, characterized in that said adjustable centering means is provided on said primary member.

6. The distributor according to claim 3, characterized in that said centering means comprises a stud member having two eccentric portions, one for adjusting angular position of said stator, the other being angularly adjustable and lockable within a hole formed in said portion of said secondary member.

7. The distributor according to claim 3, characterized in that said centering means comprises two pressures screws screwed within threaded holes in said portion of said secondary member and acting in opposition on peripheral substantially radial bearing surfaces of said stator.

8. The distributor according to claim 1, characterized in that said driving protrusion is formed on an intermediate annular member mounted on a flange portion integral with said primary member for rotation therewith.

9. A hydraulic rotary distributor, comprising a primary rotary member to be connected to a driving device and connected for rotation with a valve rotor, a secondary rotary member to be connected to a driven unit and connected for rotation to a valve stator, said valve stator and valve rotor cooperating mutually to control a double acting motor assisting said driven unit, said secondary member having a portion surrounding at least a portion of said primary member, said primary and secondary members being coupled by a lost motion coupling which permits a limited relative angular movement of said members, at least a C-shaped spring having separated facing ends surrounding at least said primary member, and connecting means associating said separated ends of said C-shaped spring with said primary member to maintain the primary member in a centered rest position, characterized in that said spring has end portions shaped to form radial end lugs which extend through at least a radial aperture formed within said portion of said secondary member, said end lugs normally cooperating in abutment with sides of said radial aperture and comprising part of the connecting means which forms part of said lost motion coupling, the end lugs each including a radially outwardly extending portion extending through said aperture in said portion of the secondary member surrounding said primary member, the spring being disposed between said portion of said secondary member and said primary member, and the outwardly extending portion of said end lugs having facing sides normally in bearing engagement with opposite sides of a central stop extending axially within said radial aperture of said portion of the secondary member surrounding the primary member.

10. The distributor according to claim 9, characterized in that said aperture and said central stop are formed in an additional part angularly adjustably mounted on said portion of said secondary member (2).

11. The distributor according to claim 10, characterized in that said additional part is a ring member disposed around said portion of said secondary member and provided with inwardly extending protrusions which form said aperture and said central stop, and wherein said portion of said secondary member is formed with recesses into which extend said protrusions.

12. The distributor according to claim 10, characterized in that said additional part is a ring member mounted axially on the front edge of said portion of said secondary member and having, on its front annular mounting face, slots forming said aperture and said central stop.

13. A hydraulic rotary distributor, comprising a primary rotary member having an axis and connectable to a driving device and connected for rotation with a valve rotor, a secondary rotary member coaxial with said primary rotary member and connectable to a driven unit and connected for rotation to a valve stator, said valve stator and valve rotor cooperating mutually when rotated one relative to the other on both sides of a centered rest position to control a double acting motor assisting said driven unit, at least one C-shaped spring surrounding substantially coaxially at least said primary member and having separated facing end portions engageable under a preload with first and second mating parts connected respectively to said primary and secondary rotary members for rotation therewith, the resilience of said spring maintaining said mating parts in a position wherein said valve stator and valve rotor are in said centered rest position, said first mating parts formed by first facing radial sidewalls of a radial recess formed in said primary rotary member, said second mating parts formed by second facing radial sidewalls of a radial aperture formed in a tubular part integral with said secondary rotary member surrounding said primary rotary member, the radial aperture disposed radially adjacent said radial recess, said end portions of said C-shaped spring shaped to form radial end lugs having opposite radial surfaces, and said end lugs received within said radial aperture and radial recess and each of said opposite radial surfaces in contact engagement with respective first and second facing radial sidewalls when said valve stator and valve rotor are in said centered rest position.

14. The distributor of claim 13, wherein said end lugs are substantially coplanar in a plane perpendicular to said axis, and forming an angular lost motion connection between said primary and secondary rotary members.

15. The distributor of claim 14, wherein said spring is arranged around said tubular part, said end lugs extending radially inwardly through said radial aperture and into said radial recess.

16. The distributor of claim 15, wherein the distributor further comprises a second C-spring, the C-springs axially adjacent and diametrically inverted, said primary rotary member and tubular part having two diametrically opposed radial recesses and radial apertures, respectively.

17. The distributor of claim 14, wherein said spring is arranged between said primary rotary member and said tubular part, said end lugs each having radially inwardly and outwardly extending portions received respectively in said radial recess and radial aperture.

18. The distributor of claim 17, wherein the distributor further comprises a second C-spring, the C-springs axially adjacent and diametrically inverted, said primary rotary member and tubular part having two diametrically opposed radial recesses and radial apertures, respectively.

19. The distributor of claim 13, wherein said valve rotor and valve stator are housed within said part integral with said secondary rotary member and surrounding said primary rotary member.

20. The distributor of claim 13, wherein the distributor further comprises a second C-spring, the C-springs diametrically inverted.

21. The distributor of claim 13, wherein the distributor comprises adjustable centering means for adjustably centering said rest position of said primary rotary member with respect to said secondary rotary member.

22. The distributor of claim 21, wherein said adjustable centering means is provided on said secondary rotary member.

23. The distributor of claim 21, wherein said adjustable centering means comprises a stud member having two eccentric portions, one for adjusting angular position of said stator and the other being angularly adjustable and lockable within a hole formed in said part integral with said secondary rotary member.

24. The distributor of claim 21, wherein said adjustable centering means comprises two pressure screws screwed within threaded holes in said part integral with said secondary rotary member and acting in opposition on peripheral, substantially radial bearing surfaces of said stator.

25. A hydraulic rotary distributor, comprising first and second coaxial rotary distributor members having mutually cooperating fluid distribution means for controlling a hydraulic motor when rotated one relative to the other on both sides of a centered rest position, said first and second coaxial rotary distributor members coupled respectively to primary and secondary shaft members for rotation therewith, at least one substantially flat C-shaped spring surrounding at least said primary shaft member and having separated facing end portions engageable under a preload with first and second mating parts connected respectively to said primary and secondary shaft members for rotation therewith, resilience of said spring maintaining said mating parts in a relative position wherein said first and second coaxial rotary distributor members are in said centered rest position, wherein said end portions of said spring form separated and adjacent coplanar radial end lugs having opposite radial surfaces cooperating in bearing engagement with radially offset first and second mating surfaces formed in the first and second mating parts which are integral with said primary and secondary shaft members, respectively, each said radial surface of said end lugs in contact engagement with respective adjacent first and second mating surfaces when said first and second coaxial rotary distributor members are in said centered rest position.

26. The distributor of claim 25, wherein said first mating surfaces are formed by first facing radial sidewalls of a radial recess formed in a flange part connected for rotation to said primary shaft member and surrounded by said spring, said second mating surfaces formed by second facing radial sidewalls of a radial aperture formed in a tubular part surrounding coaxially said flange part.

27. The distributor of claim 26, wherein said spring is arranged around said tubular part, said end lugs extending radially inwardly through said radial aperture and into said radial recess.

28. The distributor of claim 27, further comprising a second C-shaped spring, the C-shaped springs axially adjacent and diametrically inverted, said tubular part and flange part having two diametrically opposed radial recesses and radial apertures, respectively.

29. The distributor of claim 26, wherein said spring is arranged radially between said tubular part and said flange part, said end lugs each having radially inwardly and outwardly extending portions extending respectively into said radial recess and radial aperture.

30. The distributor of claim 29, further comprising a second C-shaped spring, the C-shaped springs axially adjacent and diametrically inverted, said tubular part and flange part having two diametrically opposed radial recesses and radial apertures, respectively.

* * * * *